Sept. 26, 1972     H. SCHIPPERS ET AL     3,694,292
EXTRUSION HEAD FOR PRODUCING A MULTILAYER BLOWN TUBULAR FILM
Filed June 12, 1970     2 Sheets-Sheet 1
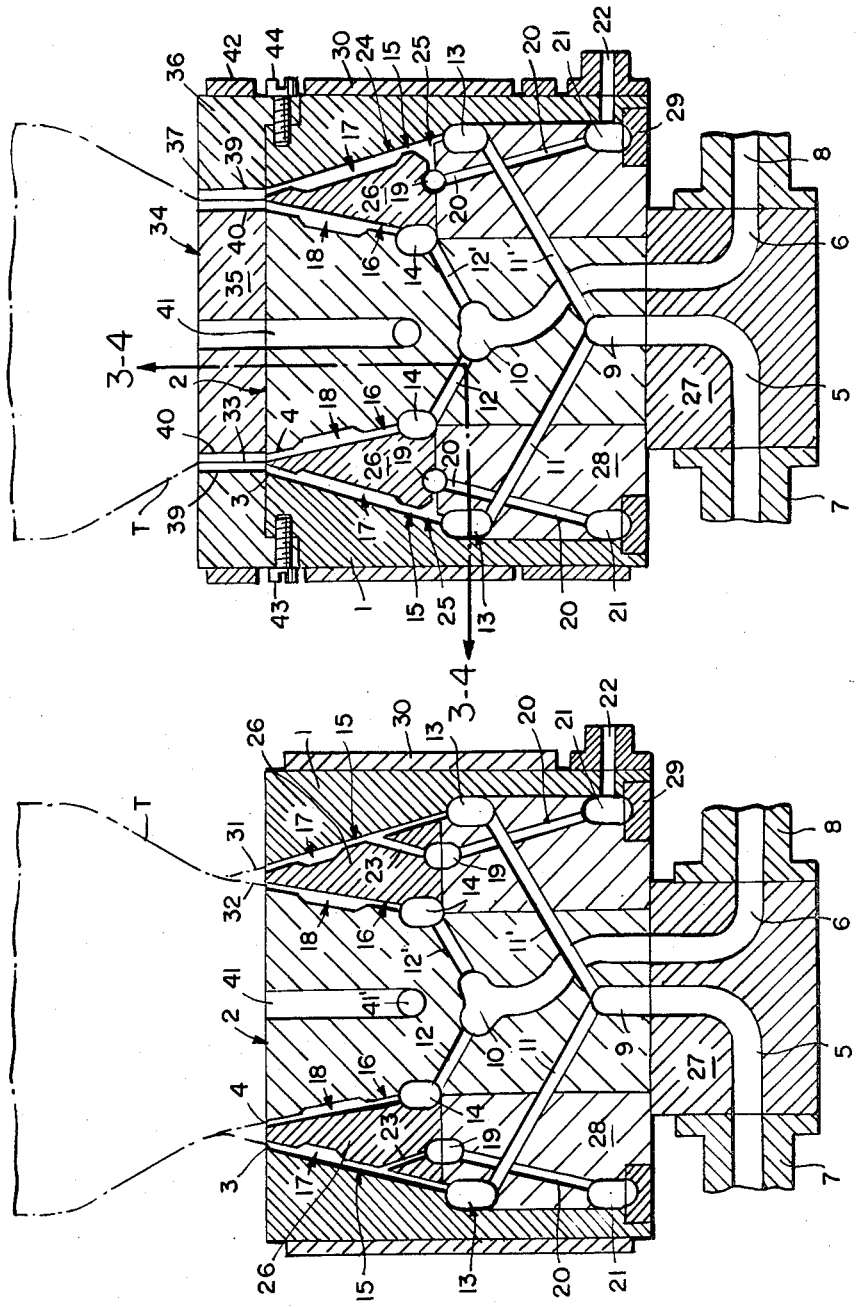
INVENTORS:
HEINZ SCHIPPERS
FRIEDHELM HENSEN
REINHOLD JUNG
BY
*Johnston, Root, O'Keeffe, Keil, Thompson & Shurtleff*
ATT'YS

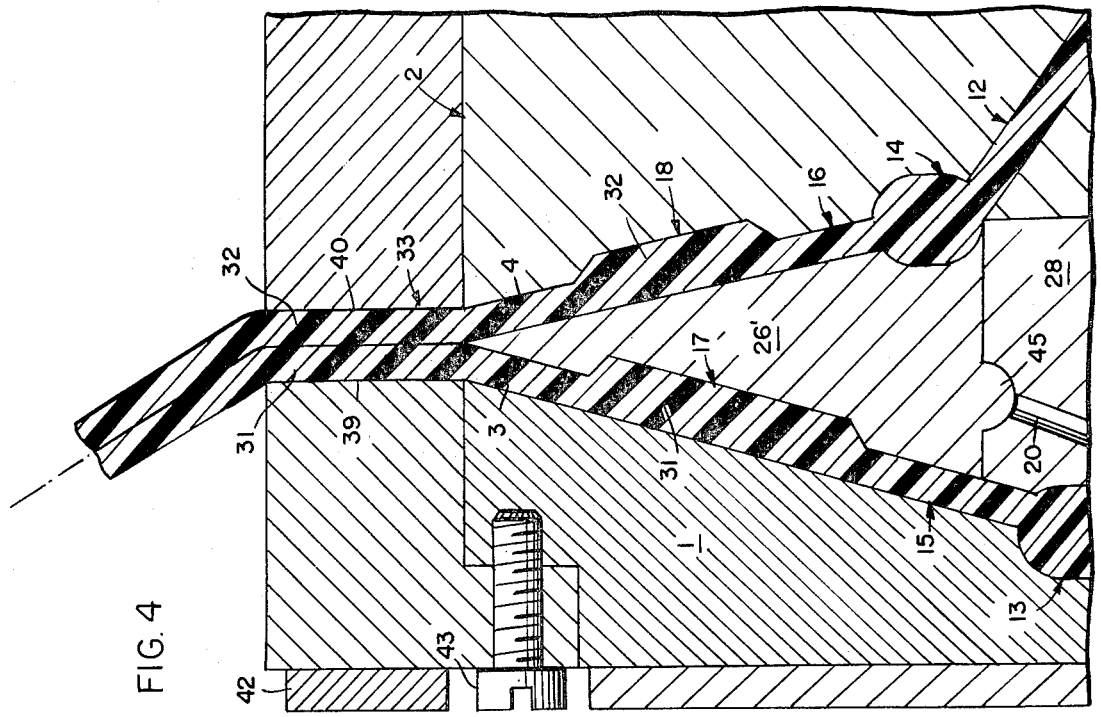
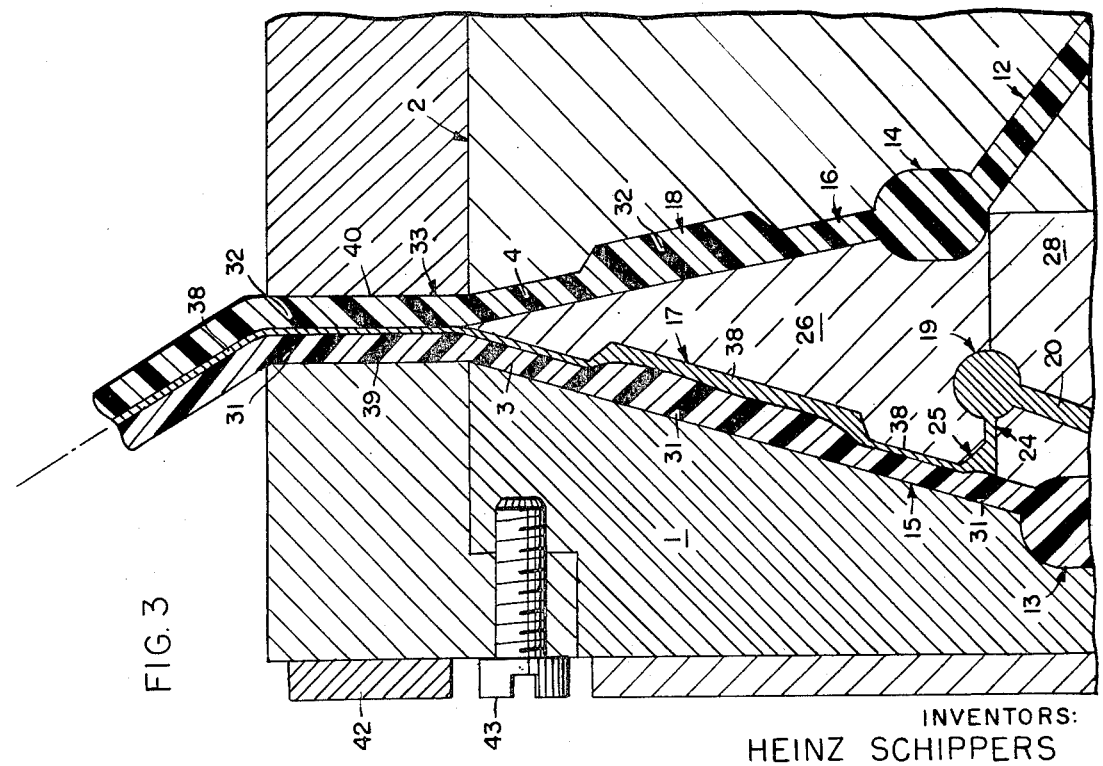

United States Patent Office 3,694,292
Patented Sept. 26, 1972

3,694,292
EXTRUSION HEAD FOR PRODUCING A MULTILAYER BLOWN TUBULAR FILM
Heinz Schippers, 39 Ringstr.; and Friedhelm Hensen, 79 Hohenweg, both of Remscheid-11, Germany; and Reinhold Jung, Pohlhausen, Wermelskirchen, Germany
Filed June 12, 1970, Ser. No. 45,636
Claims priority, application Germany, June 19, 1969, P 19 30 987.6
Int. Cl. B22d 23/04
U.S. Cl. 156—501
12 Claims

ABSTRACT OF THE DISCLOSURE

An extrusion head for producing a multilayer blown tubular film from thermoplastic polymer melts with the film layers being adhered by a bonding agent, the extrusion head including at least one annular channel associated with two adjacent melt extrusion passages and in fluid connection with at least one of the two passages to provide an uninterrupted, uniform surface coating of a liquid bonding agent on at least one of the opposing surfaces of the film layers as they are melt extruded. The extrusion head advantageously includes a calibrating block which can be heated or cooled and which serves to join the film layers together.

---

Extrusion heads are known which comprise several concentric tubular dies or annular extrusion slots or passages through which a synthetic thermoplastic polymer can be extruded in molten form. In these known extrusion heads, the tubular dies or annular slots are situated in the exposed face of the optionally heatable body of the extrusion head with each tubular die being connected to a feed conduit for a molten thermoplastic polymer or resin by way of distributor conduits and in some instances with pressure compensating conduits. Typical thermoplastic polymers which are commonly used to form such multilayered films or tubes include, by way of example, polyolefins such as polyethylene or polypropylene, polyvinyl chloride, polyamides or similar film-forming synthetic linear polymers. Such polymers are generally melted in a heated extruder, preferably with means to degasify the melt, and placed under the pressure required for extrusion as the melt is delivered to the extruder head. Extrusion devices of this type are generally constructed in such a manner that the individual tubes or tubular films emerge from the tubular dies or annular slots so as to be arranged concentrically inside one another, the individual tubes or separate layers of individual films being drawn from the extrusion head independently of each other and united together only outside of the extrusion head. On the other hand, extrusion heads or dies for the manufacture of multilayered blown films are also known in which the individual film layers are brought together inside the extrusion head and then emerge as a composite tube or tubular film.

When producing multilayered tubes or multilayered blown tubular films wherein the individual layers consist of the same or very similar polymer materials, there is usually no difficulty in making certain that the individual layers will become firmly and permanently welded together while they are still in the thermoplastic state. However, if the individual layers being extruded are composed of polymers which differ substantially from each other in their chemical structure, for example where one layer to be united consists of polyethylene while the other layer consists of a polyamide, considerable difficulties can arise in obtaining a secure adhesion between these two distinct layers. When two such distinct polymer layers are simply pressed together in the thermoplastic state, a secure joint generally is not achieved over the entire surface area of both layers. In order to overcome this problem, it has been suggested that a suitable quantity of an adhesive agent be added to at least one of the two layers, for example by incorporating an acrylic acid ester, polyvinyl acetate or the like (see Modern Plastics, June 1968, page 78).

Attempts have also been made to improve the bond between the two distinct polymer layers by treating the surfaces which are to be united with a powerful oxidizing agent such as nitric oxide, sulfur dioxide, ozone or the like at some point in the operation before the layers are pressed together. In this instance, an adhesive intermediate layer is produced between the two extruded film layers and has the effect of strengthening the bond between the two film layers which are normally considered to be heterogeneous with reference to each other. In addition to such oxidizing agents, it has also been proposed to use gaseous polymerizable substances such as styrene, vinylchloride, butadiene or the like in order to still further enhance the strength of the bond.

The above-mentioned gaseous substances as bonding agents have a very practical disadvantage in that they can only be brought into contact with the surfaces to be joined after the film layers are extruded and are located outside of the extrusion head where they can be properly exposed to gases. Moreover, such gaseous substances often exhibit a strongly corrosive action on the extrusion tool itself and may cause irreparable damage to the extrusion head and particularly the die face thereof.

If one desires to use a liquid bonding or adhesive agent, difficulties arise in attempting to distribute such liquid materials in thin layers and as uniformly as possible over the surface or surfaces of the film layers which are to be united. A very uniform distribution of the liquid adhesive is absolutely essential because otherwise a streaky or partially coated surface tends to be formed and the individual layers of the composite tube or tubular film product become detached from one another in strips. Thus, under the normal conditions of temperature and pressure for the extrusion of polymer films, the use of a liquid bonding agent has presented extremely difficult problems in achieving a final product of uniform quality and one which is substantially free of detached portions. In general, it is believed that prior methods and apparatus do not provide a satisfactory solution for achieving strong, adherent bonding between adjacent layers of a multilayered tube or tubular film in which the individual layers are composed of different polymers, particularly when attempting to use a liquid bonding agent.

One object of the present invention is to provide an extrusion head, which includes concentric tubular dies, whereby a plurality of tubular films can be simultaneously extruded in the form of separate polymer melts with the separate layers united strongly together in a very uniform and substantially permanent manner. Another object of the invention is to provide an extrusion head for producing multilayered blown tubular films or the like wherein a liquid bonding agent can be very uniformly and simply applied onto the surface of one or more of the individually extruded layers. Other objects and advantages of the invention will become more apparent upon consideration of the following detailed specification.

There has now been provided, in accordance with the invention, an extrusion head for producing multilayered tubular bodies and especially blown tubular films with firmly joined adjacent tubes or tubular film layers, this extrusion head essentially including an annular feed channel for a liquid or molten bonding agent adapted to supply this bonding agent over the entire circumference of at least one of the layers of thermoplastic polymer melt as it is being extruded through an extrusion passage toward the die face. More specifically, this supply or application of the liquid bonding agent as a thin surface coating on the layer or layers of tubular film should take place within the extrusion head at a point or location at which the extrusion pressure of the melt is not substantially reduced, i.e. a location relatively close to the distribution of the melt as it emerges from a conventional extruder and is fed into the annular extrusion passages of the head.

In addition to a first conduit means for separately supplying a polymer melt at the extrusion pressure to each of the annular extrusion passages, the extrusion head of the invention essentially includes at least one annular feed channel for the liquid bonding agent formed by the internal wall structure of the head and arranged within the angle defined by the convergence of two adjacent annular melt extrusion passages, the annular feed channel having a terminal portion in fluid communication with at least one of the two adjacent extrusion passages around the entire circumference thereof at said point or location where the extrusion pressure of the melt has been reduced as little as possible within the head. Second conduit means are provided to separately supply the liquid bonding agent to the annular feed channel.

The extrusion head of the invention is further illustrated by way of certain preferred embodiments as set forth in the accompanying drawing in which similar parts are identified by the same reference numeral and in which:

FIG. 1 is a partly diagrammatic cross-sectional view taken through the longitudinal axis of a substantially cylindrical extrusion head exemplifying one embodiment of the invention;

FIG. 2 is a cross-sectional view similar to FIG. 1 but illustrating another embodiment of the invention;

FIG. 3 is a fragmentary cross-sectional view taken from the upper left-hand portion of FIG. 2 and somewhat enlarged to indicate in greater detail the application of the liquid bonding agent during extrusion and joining of adjacent film layers; and FIG. 4 is a fragmentary cross-sectional view corresponding to FIG. 3 but with the replacement of one segment or member of the extrusion head of block off the annular channel leading to the extrusion passages.

Referring first to FIGS. 1 and 2 of the drawings, the extrusion head is outwardly defined by a tool body or cyclindrical casing 1 which encloses several suitably shaped parts or block inserts fitted together and held in place in a conventional manner, for example with bolts, threaded clamping rings, spanners or the like, all of which are commonly employed in extrusion heads. The upper parts have been cut away so that several concentric tubular dies or annular die slots 3 and 4 of predetermined internal width are provided at the exposed end or die face 2. The number of tubular dies used depends on the number of layers of thermoplastic polymer which are to be joined together to form a common tube or tubular film. In the embodiment illustrated in FIGS. 1 and 2, two tubular dies or die slots 3 and 4 are employed.

The thermoplastic polymers or resins to be extruded as film layers are each initially supplied to the annular die slots 3 and 4 from feed lines 5 and 6, respectively. The feed or supply lines 5 and 6 may be connected to a conventional pressure pump, an extruder or the like by the additional flange connected conduits or pipes 7 and 8.

In the illustrated embodiments, the lines or conduits 5 and 6 lead to branching or distribution points 9 and 10 which are situated behind one another in the axial direction exactly in the middle of the casing 1, i.e. on its central axis. The branching points 9 and 10 form the internal supply points for a distribution means which is arranged so that the tubular dies or annular die slots 3 and 4 can be supplied in a completely identical manner with molten material from a central station or source of supply. A symmetrical arrangement of all such feed and distributor lines ensures a uniform flow of the melt and assists in equalizing the extrusion pressure at circumferential points of the annular extrusion passages arranged on the same transverse plane, i.e. radially perpendicular to the axis of the extruder head. For this supply of each polymer melt, the branching points 9 and 10 are connected to the enlarged annular conduits 13 and 14, respectively, by several radially extended or inclined connecting conduits 11, 11' and 12, 12', etc., preferably using at least several such distributing conduits in the form of tubular spokes extending from each central supply source outwardly to the extrusion passages where they are connected at uniformly spaced intervals around the circumference of the annular conduits 13 and 14.

These enlarged conduits 13 and 14 at the beginning of the extrusion passages help to homogenize the material more completely and to equalize the pressure. They are uniformly connected over their whole circumference to the annular die slots 3 and 4 by way of the annular extrusion gaps or passages 15 and 16. It has been found especially advantageous to have portions of increased internal width worked into the passages 15 and 16, as indicated at 17 and 18 in the drawing. In these zones of enlarged cross-sectional area, a disturbance of the melt flow occurs in that the flow velocity is reduced, which in turn has an advantageous effect in uniformly wetting the melt with a liquid bonding agent.

For supplying the molten or liquid bonding agent, the extrusion heads represented in the drawing are provided according to the invention with an additional enlarged annular conduit 19 which is fed from outside the head or casing 1. In the examples illustrated, this enlarged annular conduit 19 is connected to still another annular conduit 21 by way of at least one but preferably several connecting channels or tubes 20 which are bored through the block insert 28 at circumferential positions between the melt supply tubes 11, 11' as diagrammatically illustrated. This annular conduit 21 is supplied with the liquid or molten bonding agent from outside the tool body via a radial line 22 which continues through a supply pipe connected to the casing 1.

For the purposes of the invention, the apparatus need not necessarily be constructed exactly as in the examples illustrated. However, it is desirable to arrange the initial portion of the annular channel carrying the liquid bonding agent to the extrusion passages, e.g. the annular ring 19, within the angle defined by the convergence of the extrusion passages, e.g. the angle defined by annular die slots 3 and 4. On the other hand, the lower enlarged annular conduit 21 may be omitted and one or more ducts 22 may be introduced directly into the annular conduit 19. The embodiment illustrated has the advantage that the pressure of the liquid bonding agent is more uniform in the whole extrusion head, and moreover, the extrusion head in the form illustrated can be very easily contructed and assembled and is also easily dismantled for periodic cleaning.

In the embodiment represented in FIG. 1, the enlarged annular conduit 19 is connected by way of an annular gap or channel 23 to the outer extrusion passage 15 which serves to supply the melt at an apprropriate extrusion pressure in forming the outer layer of film. The terminal portion of the annular channel 23 opens at an acute angle of about 30° into the conduit 15, and thus the molten or liquid bonding agent readily makes contact with the melt flowing through the conduit 15. In referring to the angle at which the annular channel opens into the melt extrusion passage, it will be understood that this is the angle at which the liquid or molten streams converge together in their direction of flow, i.e. an angle measured opposite to the flow direction.

FIG. 2 shows another structural embodiment of the invention, in which the enlarged annular conduit 19 for the liquid bonding agent is first connected to a constricted zone 24 which is similar in its effect to the annular channel 23 of FIG. 1. This restriction of the channel 24, however, then continues into a zone 25 of enlarged cross-sectional area which forms a reservoir for the molten or liquid bonding agent. This embodiment has the special advantage that fluctuation in pressure and flow velocity both of the liquid bonding agent and of the polymer melt which must be wetted are more completely equalized.

With the embodiment of FIG. 2, the liquid bonding agent is supplied to the melt extrusion passage at a location or zone where there has been very little if any drop in the extrusion pressure exerted on the polymer melt over the entire extrusion head, i.e. at a location arranged as closely as possible to the enlarged annular conduit 13. By providing at least a short portion 24 of constricted internal width or substantially smaller cross-sectional area as compared to the cross-sectional area of the extrusion passage 15, a so-called throttle effect is achieved and a small reservoir of liquid bonding agent is formed in the region or zone 25 which preferably has a substantially larger cross-sectional area than that of the extrusion passage 15 connected thereto. This same throttle effect is achieved to a lesser extent by the embodiment of FIG. 1 in which the relatively narrow annular channel 23 opens at an angle into the extrusion passage 15, the cross-sectional area at the point of connection forming a relatively small reservoir which is nevertheless larger than either cross-sectional area of the extended channel 23 or passage 15.

Even with the embodiment shown in FIG. 2, it is advantageous for at least a part of the enlarged terminal portion or zone 25 of the annular channel 24 to open into its connected extrusion passage 15 at an acute angle. However, the rear wall of channel 24 can extend substantially radially to intersect the connected wall of the extrusion passage 15 at a larger opening angle, preferably not more than 90°, while the front wall of this annular channel 24 first extends parallel to the back wall to form the constricted zone and then diverges at an acute angle to intersect the connected wall of the extrusion passage 15, thereby providing the desired reservoir 25.

In all instances, it is of course desirable to supply the molten or liquid bonding agent by means of any suitable feed pump through channel 23 (FIG. 1) or the constricted and then widened channel 24, 25 (FIG. 2) at a pressure slightly above the pressure of the polymer melt at the point of connection with the extrusion passage 15. At the same time, the enlarged channel 25 as well as the intermediate enlarged zones 17 or 18 of the extrusion passages 15 or 16 have a very beneficial effect in equalizing the applied pressures and uniformly spreading the liquid bonding agent over the entire circumferential surface of the extruded film layer as a thin and integral coating.

In order to uniformly maintain the temperature inside the extrusion head at the optimum temperature for processing the synthetic resin or polymer melts, the extrusion head according to the invention is preferably surrounded in known manner with one or more heating sleeves 30. The film layers being extruded by the processing operation are indicated in the drawings at 31 and 32.

The apparatus according to the invention thus enables a very thin film of a liquid bonding agent to be applied uniformly over at least one of the two surfaces which are to be joined together. In order to make the best possible use of the advantageous properties of the coating of the bonding agent achieved with this apparatus, it is desirable to establish exact shape and dimensions of the zone 33 in which the film layers 31 and 32 to be united are brought close to each other without making actual contact, i.e. to provide a narrow gap filled by the intermediate layer of the bonding agent. For this purpose, a calibrating device 34 which preferably has an adjustable annular gap is mounted on the die face 2 of the extrusion head according to the invention.

In the embodiment shown in FIGS. 2–4, this calibrating device consists of two concentric parts, a calibrating central plate 35 and a calibrating ring 36. These two parts leave an annular gap or opening 37 for the exit of the film layers 31 and 32 or of the composite tubular film T with the bonding layer 38 sandwiched between the two film layers. Walls 39 and 40 of the calibrating device 34 are situated at a predetermined suitable distance apart which is preferably adjustable. Joining of the two tubular films 31 and 32 then occurs approximately where the two films leave the extrusion head which has been extended by the calibrating device. By shifting the parts 35 and 36 or adjusting their size in relation to each other, the outlet gap 37 can be adjusted so that its width is uniform over its entire circumference and consequently the two films 31 and 32 are uniformly joined together. The calibrating device 34 of predetermined size of the plate 35 and ring 36 may be adjusted and fixed in position, for example, by means of a feeler gauge and tightening screws 43 and 44.

A gas supply conduit 41 with a radially introduced feed line 41' is also provided in known manner for blowing up the extruded tubular film. Means for withdrawing and collapsing the blown tubular film are well known in this art and do not constitute part of the invention in terms of its essential features.

FIG. 2 also shows the calibrating device 34 surrounded by a heating sleeve 42 which enables the temperature in the calibrating device to be exactly adjusted to the optimum value. This value may be above or slightly below the temperature of the rest of the film blowing tool.

Of course, it must also be pointed out that the sleeve 42 may be a cooling sleeve which can be equipped, for example, with Peltier elements or the like, an instrument which enables the tubular films 31 and 32 to be cooled quite rapidly to a temperature below the extrusion temperature but if possible still above the minimum welding or bonding temperature. Such cooling means as well as other conventional means of processing the composite tubular film as it is blown and drawn from the extrusion head may be employed in a conventional manner. Thus, while blowing causes a transverse stretching of the composite tube, positive draw rolls or other means can also be provided to cause a longitudinal stretching. Accurate temperature control is desirable in these operations to obtain a uniform film structure as well as maintaining a thin but effective bonding layer.

In FIG. 3, the individual layers 31 and 32 of molten polymer as they are extruded and formed into a composite tube or tubular blown film T are generally shown in terms of occupying all or the major portion of the width of each passage through which they are conducted. The layer of the liquid bonding agent 38 is quite thin during its passage with the film layer 31 through the extrusion head and after it is joined between the two film layers 31 and 32. However, this thin layer 38 of the bonding agent completely coats the surface of the film layer to which it is applied and it is of surprisingly uniform thickness in the composite tubular product.

FIG. 4 of the drawings illustrates the manner in which the annular wedge-shaped element 26 of FIGS. 2 or 3, having a substantially frusto-conical cross-section and containing at least a portion of the annular channel 19, 24 and 25, can be replaced by a similar wedge-shaped element 26' in which the radially directed channel has been omitted, i.e. to block off the fluid line used for the liquid bonding agent. The substitute element 26' can be provided with a rounded annular protuberance 45 which fits into the remaining annular recess of element 28 which normally forms the annular reservoir 19 of FIGS. 2 or 3. This not only blocks off the feed tubes 20 but also provides an accurate seating of the element 26' on the lower element 28. Of course, such tongue-in-groove seating may also be employed for positioning and holding all of the elements enclosed within the casing 1, including the embodiments of FIGS. 1–3, provided that there is no serious interference with the flow of the liquid bonding agent in this latter instance.

The possibility of interchanging the wedge-shaped element 26 is of particular advantage in permitting different elements to be inserted with variations in the sizes of channels for the bonding agent, e.g. the constricted channel 24, and also in permitting replacement with the blocking insert 26' as shown in FIG. 4 so that the same extrusion head can be used to manufacture multilayered films either with or without the annular channels adapted to provide a uniform supply of a liquid bonding agent. Thus, where a bonding agent is not required, the same tool can be used with only a minor change in structure. In order to remove or replace the elements 26 or 26', a base ring 29 must first be detached where it is threaded, bolted or otherwise clamped onto the extrusion head, and the lower element 28 can then be removed axially, and element 26 or 26' is then easily dismantled by withdrawing it from below through the resulting opening. Of course, one must first remove the entire extrusion head from the supporting member 27 containing feed lines 5 and 6, but this is a conventional operation if only to clean the feed lines or to attach another set of feed lines.

The extrusion head according to the invention thus provides a uniform supply of a liquid bonding agent from an additional annular channel which is more or less concentrically located between two annular extrusion passages such that the entire surface of at least one of the two polymer film layers to be united is coated with a thin film of the bonding agent. The term "liquid bonding agent" is intended to include adhesive formulations in which the adhesive is dissolved or suspended in a liquid solvent as well as molten adhesives. Any number of suitable liquid bonding agents or adhesives can be readily selected by those skilled in this art, preferably with a sufficiently low viscosity to permit uniform flow through the annular supply lines or channels. It is advantageous to select a liquid bonding agent with a viscosity under the temperature conditions of the extrusion head which is in about the same range of viscosity as the extruded polymer melts being coated.

By providing suitable located reservoirs or intermediate zones of enlarged gap width or enlarged cross-sectional area in all of the extrusion passages as well as in the annular feed channel for the liquid bonding agent, it is possible to compensate for slight fluctuations in the pressure or in the output of the pump supplying the polymer melt and also of the pump supplying the liquid bonding material. For example, with increasing pressure of the polymer melt and decreasing pressure of the liquid bonding agent, the film or layer of the melt enters further into the reservoir but without losing contact with the thin film of the bonding agent so that there is no break in wetting the polymer film surface.

The calibrating device on the die face serves to provide sufficient support for the extruded tubular films as they issue from the annular die slots but before they are firmly bonded together. By carefully regulating the temperature of this calibrating device, a premature cooling of the extruded composite tube can be prevented, or if desired, a definite heating or cooling effect can be achieved so that the polymer film layers are united at their optimum temperature. These and other variations in the operation of the extrusion head of the invention will be readily apparent to those skilled in this art.

The invention is hereby claimed as follows:

1. In an extrusion head for producing a multilayer blown tubular film from thermoplastic polymer melts through a plurality of concentrically arranged annular slots at the die face of said extrusion head with a corresponding plurality of annular extrusion passages extending axially of the head and converging radially forwardly to join separately extruded film layers near said die face, the improvement which comprises:

an axially interchangeable annular wedge-shaped element of substantially frusto-conical cross-section with side walls diverging radially backwardly away from said die face to at least partly define each of a pair of adjacent annular extrusion passages formed together with the opposing internal wall structure of said head, said wedge-shaped element further containing at least one annular feed channel for a liquid bonding agent arranged between said diverging side walls to extend from the base of said wedge-shaped element forwardly to a terminal portion in fluid communication with at least one of said adjacent annular extrusion passages around the entire circumference thereof;

means to hold said wedge-shaped element in a fixed position defining said adjacent annular extrusion passages within said head;

first conduit means for separately supplying a polymer melt to each of said annular extrusion passages; and second conduit means to separately supply a liquid bonding agent to said annular feed channel.

2. An extrusion head as claimed in claim 1 wherein the terminal portion of the annular feed channel in fluid communication with an adjacent annular extrusion passage is located at a point along said extrusion passage where the extrusion pressure is not substantially reduced, said point being closer to the supply end of said extrusion passage than the die face end thereof.

3. An extrusion head as claimed in claim 1 wherein said annular wedge-shaped element containing said annular feed channel is interchangeable with a second annular wedge-shaped element having a solid portion blocking fluid communication between said second conduit means and said adjacent extrusion passages.

4. An extrusion head as claimed in claim 1 including a terminal portion of said annular feed channel which extends axially between said adjacent annular extrusion passages and opens at an actuate angle into the extrusion passage with which it is in fluid communication.

5. An extrusion head as claimed in claim 4 wherein said extrusion passage includes an intermediate zone of increased cross-sectional area between (a) the zone at which said terminal portion of said annular feed channel opens thereinto at an acute angle and (b) the final zone of the extrusion passage at the die face.

6. An extrusion head as claimed in claim 1 wherein said annular feed channel includes at least a short portion of constricted internal width which widens in the terminal portion thereof opening into said extrusion passage, the cross-sectional area of said constricted portion being substantially smaller than the cross-sectional area of the extrusion passage to which it is connected.

7. An extrusion head as claimed in claim 6 wherein the widened opening of said terminal portion of the annular feed channel has a cross-sectional area substantially larger than the cross-sectional area of the extrusion passage connected thereto.

8. An extrusion head as claimed in claim 7 wherein at least part of said terminal portion of the annular feed channel opens into its connected extrusion passage at an acute angle.

9. An extrusion head as claimed in claim 6 wherein the rear wall of said annular feed channel extends substantially radially to intersect the connected wall of said extrusion passage and the front wall of said annular channel first extends parallel to said rear wall and then diverges at an acute angle to intersect the connected wall of said extrusion passage.

10. An extrusion head as claimed in claim 6 wherein said extrusion passage includes an intermediate zone of increased cross-sectional area between (a) the zone at which said terminal portion of said annular feed channel opens thereinto and (b) the final zone of the extrusion passage at the die face.

11. An extrusion head as claimed in claim 1 wherein a calibrating block is mounted on the die face of said head, said block containing adjustable annular slot means to receive and guide the extruded layers of film from said extrusion passages into adhering contact with each other.

12. An extrusion head as claimed in claim 11 including means to maintain said calibrating block at a predetermined temperature.

References Cited

UNITED STATES PATENTS

| | | | |
|---|---|---|---|
| 3,275,725 | 9/1966 | Utz | 18—14 P UX |
| 3,546,743 | 12/1970 | Roth | 18—14 P |
| 3,266,093 | 8/1966 | Corbett | 18—13 P UX |
| 3,221,372 | 12/1965 | Lieberman | 18—14 P |

J. SPENCER OVERHOLSER, Primary Examiner

N. E. LEHRER, Assistant Examiner

U.S. Cl. X.R.

425—133, 190, 326, 467